United States Patent [19]

Smith et al.

[11] 4,195,160
[45] Mar. 25, 1980

[54] EPOXIDE DERIVATIVES OF ESTER DIOL ALKOXYLATES AND COMPOSITIONS THEREOF

[75] Inventors: Oliver W. Smith, South Charleston; Joseph V. Koleske, Charleston; Robert J. Knopf, Saint Albans, all of W. Va.

[73] Assignee: Union Carbide Corporation, New York, N.Y.

[21] Appl. No.: 883

[22] Filed: Jan. 4, 1979

Related U.S. Application Data

[62] Division of Ser. No. 837,720, Sep. 29, 1977.

[51] Int. Cl.² .............................................. C08G 63/20
[52] U.S. Cl. .................................. 528/297; 528/288; 528/289; 525/437

[58] Field of Search ................. 528/273, 297; 260/835

[56] References Cited

U.S. PATENT DOCUMENTS

| | | | |
|---|---|---|---|
| 3,169,945 | 2/1965 | Hostettler et al. ................... | 528/355 |
| 3,320,336 | 5/1967 | Duke et al. ........................... | 260/861 |
| 3,645,984 | 2/1972 | Dowbenko et al. ................. | 260/860 |
| 3,989,662 | 11/1976 | Schmitt et al. ................... | 528/288 X |
| 4,113,702 | 9/1978 | Psencik ............................. | 528/297 X |

*Primary Examiner*—Lucille M. Phynes
*Attorney, Agent, or Firm*—Francis M. Fazio

[57] ABSTRACT

Derivatives of esterdiol alkoxylates obtained by reaction thereof with an epoxide, as well as the anhydride capped products thereof. Formulations containing the above are also claimed.

20 Claims, No Drawings

EPOXIDE DERIVATIVES OF ESTER DIOL ALKOXYLATES AND COMPOSITIONS THEREOF

This application is a division of Ser. No. 837,720, filed Sept. 29, 1977.

BACKGROUND OF THE INVENTION

Governmental regulations have placed ever increasing restrictions on the amounts and types of organic volatiles permitted to escape into the atmosphere from coating compositions. Considerable efforts have been expended to develop coatings compositions having a minimal amount of volatile organic components and this has led to the development of powder coatings, radiation-curable coatings, and water-borne coatings. High solids coatings represent another attractive technology to reduce solvent emissions. In these recent developments, the amounts of organic solvents present are minimal and consequently there is little or no atmospheric pollution.

A compound often used in the production of coating and ink formulations is 2,2-dimethyl-3-hydroxypropyl 2,2-dimethyl-3-hydroxypropionate (also known as ED-204). However, the normally solid nature of ED-204 and other ester diols has on occasion presented some problems in use. It has been recently discovered that ester diols can be reacted with alkylene oxides to form liquid vehicles which, depending upon the particular alkylene oxide selected, can be either water soluble or water insoluble; these have been called ester diol alkoxylates. Any further discoveries that would also serve to lower atmospheric pollution would be of interest for use in industry.

SUMMARY OF THE INVENTION

It has now been found that certain derivatives of the ester diol alkoxylates can be produced that are useful in the production of coating and ink formulations. These derivatives are obtained by reacting an ester diol alkoxylate with an intramolecular polycarboxylic acid anhydride, or an organic polyisocyanate, or a polyepoxide, or combinations thereof. The resulting products have been found useful in the production of high solids compositions. These high solids compositions additionally contain crosslinkers and can contain pigment, solvents, flow control agent, plus any of the other additives conventionally present in a coating or ink. They can also be blended with other polymers and latexes to yield compositions that produce dry films having acceptable properties.

DESCRIPTION OF THE INVENTION

The ester diol alkoxylate derivatives, as well as the ester diol alkoxylates themselves, and the methods for their production are discussed in detail below.

The Ester Diol Alkoxylates II

The ester diol alkoxylates belong to a new class of materials just recently discovered and the subject matter of a different application. These ester diol alkoxylates are produced by the reaction of an ester diol of the structural formula:

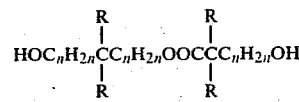

with an oxirane compound, preferably an alkylene oxide, to produce the ester diol alkoxylate of the structural formula:

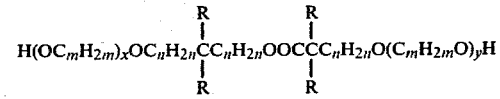

wherein m is an integer having a value of from 2 to 4, preferably 2 or 3; n is an integer having a value of from 1 to 5, preferably 1 to 3 and most preferably 1; x and y are integers each having a value of from 1 to 20, preferably 1 to 10; R is an unsubstituted or substituted, linear or branched alkyl group having from 1 to 8 carbon atoms, preferably 1 to 3 carbon atoms. The substituents on the R group can be any inert group that will not interfere with the reactions involved and can be, for example, cyano, halogen, alkoxyl, nitro, tertiary amine, sulfo, etc. In the formulas, the variables R, m, n, x and y can be the same or different at the various locations.

The novel ester diol alkoxylates (II) are preferably produced by the catalytic reaction of an ester diol (I) with an alkylene oxide or mixtures of alkylene oxides at an elevated temperature as more fully discussed below. One can manufacture the mono, mixed, blocked or capped adducts.

The alkylene oxides suitable for use in the production of the ester diol alkoxylates are the oxirane compounds such as styrene oxide, ethylene oxide, 1,2-propylene oxide, 1,3-propylene oxide, 1,2-butylene oxide, 1,3-butylene oxide and 1,4-butylene oxide as well as similar higher aliphatic monoepoxides.

The ester diols of formula I include 2,2-dimethyl-3-hydroxypropyl 2,2-dimethyl-3-hydroxypropionate; 2,2-dimethyl-4-hydroxybutyl 2,2-dimethyl-3-hydroxypropionate; 2,2-dimethyl-4-hydroxybutyl 2,2-dimethyl-4-hydroxybutyrate; 2,2-dipropyl-3-hydroxypropyl 2,2-dipropyl-3-hydroxypropionate; 2-ethyl-2 butyl-3-hydroxypropyl 2-ethyl-2-butyl-3-hydroxypropionate; 2-ethyl-2-methyl-3-hydroxypropyl 2-ethyl-2-methyl-3-hydroxypropionate; and the like.

During the reaction of the ester diol I with the alkylene oxide a catalyst is preferably used in a catalytically effective amount. The amount of catalyst is from 0.01 to 5 weight percent, preferably from 0.05 to 0.5 weight percent, based on the combined weights of ester diol I and alkylene oxide. The catalysts useful are known to those skilled in the art of alkylene oxide addition chemistry and require little further discussion here. Illustrative thereof one can mention boron trifluoride etherate, potassium, potassium hydroxide, sodium, sodium hydroxide, Lewis acids, sodium ethoxide, mineral acids, and the like.

The reaction of the ester diol with the alkylene oxide is carried out at a temperature of from 20° to 150° C., preferably from 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol charged; preferably from 2 to 20 moles.

To minimize oxidative side reactions the reaction is preferably carried out under an inert gas atmosphere using nitrogen, argon or other inert gas.

If desired an inert solvent such as toluene, benzene or 1,1,1-trichloroethane can be employed. However, the reaction proceeds well in the absence of any such solvent. In most instances a solvent is not required as the ester diol is itself a liquid at the elevated temperatures employed and serves to maintain a liquid reaction system.

At the conclusion of the reaction the product, consisting of a mixture of the novel ester diol alkoxylates, is recovered as a residue product and can be used as such; distillation procedures can also be used to recover more refined products.

The ester diol alkoxylates can be used as solvents, vehicles in paint or ink formulations, waterborne coatings, as an intermediate in the production of other valuable compounds and as a surfactant as well as in producing the derivatives of this invention.

In a typical embodiment, the ester diol and catalyst are charged to the reactor and the alkylene oxide is then added over a period of time while maintaining the desired temperature and pressure. At the completion of the addition the contents of the reactor are maintained at the selected conditions until substantially all of the alkylene oxide has reacted. The product can then be purified, if desired, and recovered by conventional procedures. In some instances one may obtain a product containing other glycols as by-products. This can be minimized by proper selection of reaction conditions and catalyst.

The Anhydride Modified Ester Diol Alkoxylates III

The catalytic reaction of the ester diol alkoxylates of formula II with an intramolecular polycarboxylic acid anhydride produces a derivative that contains free carboxyl groups. This can be illustrated by the following formula, in which phthalic anhydride is employed for illustrative purposes, that shows the resultant product

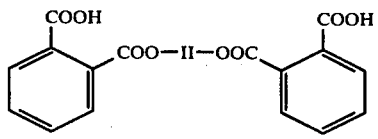

obtained by the reaction of two moles of phthalic anhydride per mole of ester diol alkoxylate II.

Illustrative of suitable polycarboxylic acid anhydrides that can be used one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the ester diol alkoxylate II can be an amount sufficient to permit reaction with all of the hydroxy groups; however, it is preferred to use an amount which is insufficient to react with all of the hydroxy groups present in the ester diol alkoxylate II or derivative thereof. This amount will vary and can be from 0.1 to 1 anhydride equivalent for each hydroxyl equivalent or group present in the ester diol alkoxylate II initially charged to the reaction mixture and is preferably from 0.1 to 0.6. In a most preferred instance, one anhydride equivalent or anhydride moiety is charged for each hydroxyl equivalent or group initially present in the reaction mixture. In the reaction a conventional esterification catalyst can be used. These are well known to those skilled in the art.

The ester diol alkoxylate II is reacted with the polycarboxylic acid anhydride at a temperature of from about 75° to 200° C., preferably from about 100° to 150° C. The time required for reaction will vary depending upon the particular reactants charged, the temperature, and the batch size of the reaction mixture, facts which are well known to those skilled in the art. Generally, it has been found that a reaction period in the laboratory of from 15 to 60 minutes at from 125° to 150° C. is adequate to produce the initial carboxyl-modified addition reaction product obtained by the reaction of these two intermediates.

The anhydride modified ester diol alkoxylate III of this reaction is a viscous liquid, in most instances. However, in some instances it has been observed that the product will solidify upon standing at room temperature for an extended period of time. This, however, does not detract from its further utility. Generally, these modified adducts are soluble in both water and solvents.

The Isocyanate Modified Ester Diol Alkoxylates IV

The catalytic reaction of the ester diol alkoxylates II with a polyisocyanate produces a hydroxyl terminated derivative that contains urethane groups IV. This can be illustrated by the following equation, in which OCNXNCO represents a diisocyanate, and shows the reaction of 2 moles of II with one mole of a diisocyanate:

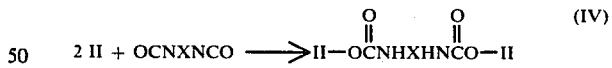

The polyisocyanates that can be used in this invention are well known to those skilled in the art and should not require detailed description herein. Any of the polyisocyanates can be used alone or in admixture with other isocyanates including the monoisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexylisocyanate, phenyl isocyanate, the o-, m-, and p-chlorophenyl isocyanates, benzyl isocyanate, naphthyl isocyanate, o-ethylphenyl isocyanate, the dichlorophenyl isocyanates, butyl isocyanate, n-propyl isocyanate, octadecyl isocyanate, 3,5,5,-trimethyl-1-isocyanato-3-isocyanatomethylcyclohexane, di(2-isocyanatoethyl)-bicyclo-(2.2.1)-hept-5-ene, 3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, dicyclohexyl-4,4'-methane diisocyanate, cyclohexane-1,4-diisocyanate, 1,5-naphthylene diisocyanate, 4,4'-diisocyanato diphenyl ether, 2,4,6-triisocyanatotoluene, 4,4',4"-triisocyanato triphenyl methane, diphenylene-4,4-diisocyanate, the polymethylene polyphenylisocyanates as well as any of the other organic isocyanates known to the average skilled chemist.

The amount of ester diol alkoxylate II used can be an amount sufficient to permit reaction of the isocyanato group with up to about 0.9 equivalent to the total number of hydroxyl groups present. Thus, from 0.025 to 0.9 isocyanato equivalent is reacted per hydroxyl equivalent, preferably from 0.04 to 0.5 isocyanato equivalent per hydroxyl equivalent, and most preferably from 0.04 to 0.25 isocyanato equivalent per hydroxyl equivalent initially charged. The conventional urethane reaction catalysts are used.

The reaction of ester diol alkoxylate II with isocyanate is conducted at a temperature of from about 25° C. to 100° C. preferably from about 40° C. to 60° C. The time required will vary depending upon the particular reactants charged, catalyst, temperature, and the batch size of the reaction mixture, facts which are well known to those skilled in the art. Generally, it has been found that a reaction period of from 1 to 5 hours at from about 40° to 60° C., is adequate to produce the urethane-modified product. This product IV can be used per se or it can be capped or modified with a carboxylic acid anhydride by the reaction of this hydroxyl terminated isocyanate modified ester diol alkoxylate IV with an intramolecular carboxylic acid anhydride by the same procedures hereinbefore described for producing the anhydride modified ester diol alkoxylates III. In this instance the compounds produced can be represented by the general schematic formula:

IV A

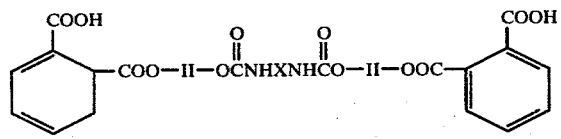

which shows the product obtained by the reaction of IV with phthalic anhydride when fully capped.

The Epoxide Modified Ester Diol Alkoxylates V

The catalytic reaction of the ester diol alkoxylate II with a diepoxide also produces a hydroxyl terminated derivative. This can be illustrated by the following equation in which two moles of II react with one mole of a diepoxide to produce V:

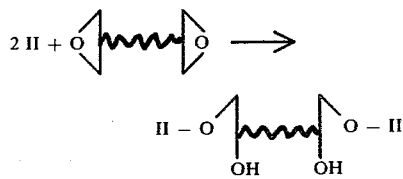
(V)

in which

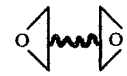

represents a diepoxide.

The diepoxides that can be used in this invention are well known to those skilled in the art and are fully described in U.S. Pat. Nos. 3,027,357; 2,890,194; and 2,890,197. Of particular interest is that portion of U.S. Pat. No. 3,027,357 beginning at column 4, line 11 to column 7, line 38, which portion and disclosure is specifically incorporated herein by reference. Among some of the specific illustrative diepoxides disclosed herein one can mention 3,4-epoxycyclohexylmethyl-3,4-epoxycyclohexane carboxylate, bis(3,4-epoxy-6-methylcyclohexylmethyl)adipate, bis(2,3-epoxycyclopentyl) ether, vinyl cyclohexene dioxide, 2-(3,4-epoxycyclohexyl)-5,5-spiro-(2,3-epoxycyclohexane)-m-dioxane, bis(3,4-epoxycyclohexylmethyl)adipate, and the like. The cycloalipatic diepoxides are preferred.

The amount of diepoxide charged to the reaction can vary from about 0.2 mole per mole of ester diol alkoxylate II initially charged to the reaction to as high as one mole of diepoxide per mole of ester diol alkoxylate II. Preferably it is from about 0.3 to 0.6 mole of diepoxide per mole of ester diol alkoxylate II initially charged. Conventional epoxide reaction catalysts are used.

Reaction of the ester diol alkoxylate II with an epoxide is conducted at a temperature of from about 100° C. to 250° C., preferably from about 140° C. to 160° C. in the presence of the known conventional catalysts. The time required will vary depending upon the particular reactants charged, catalyst, temperature, and batch size of the reaction mixture, facts which are well known to those skilled in the art. Generally, it has been found that a reaction period of from 2 to 10 hours from about 140° to 200° C., is adequate to produce the epoxide-modified product. This product can be used per se or it can be capped or modified with a carboxylic acid anhydride by the reaction of this hydroxyl terminated epoxide modified ester diol alkoxylate V with an intramolecular carboxylic acid anhydride by the same procedures hereinbefore described for producing the anhydride modified ester diol alkoxylates III. In this instance the compounds produced can be represented by the general schematic formula:

V A

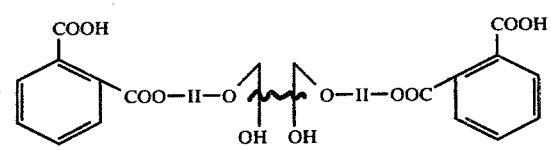

which shows the product obtained by reaction of V with phthalic anhydride when fully capped.

Formulated Compositions Using Polyols

The modified ester diol alkoxylate derivatives of the types represented by formulas III, IV, IV A, V and V A can be formulated to produce coating and ink compositions by the addition thereto of crosslinkers, polyols, pigments, fillers, and other additives conventionally used in the production of coatings and inks.

In producing the formulated compositions a crosslinker such as a methylolated melamine can be used in an amount from 25 to 200 weight percent, preferably from 25 to 100 weight percent, of the modified ester diol alkoxylate charged. These compounds are well known and many are commercially available. Those suitable for use can be represented by the general formula:

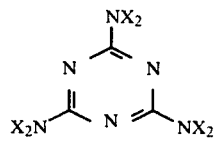

wherein X is hydrogen or —CH$_2$OCH$_3$ and wherein at least two of the X substituents are —CH$_2$OCH$_3$ groups. The preferred melamine derivatives are the highly methylolated melamines, with hexamethoxymethylmelamine most preferred. Other amino resins that can be used include the urea and benzoguanamine resins.

In addition one can have present a non-volatile low molecular weight polyol containing from 2 to 6, preferably 2 to 4 hydroxyl groups. These non-volatile low molecular weight polyols can have a molecular weight of from 62 to about 1000. They can be aliphatic cycloaliphatic or aromatic in nature. Illustrative thereof one can mention ethylene glycol, diethylene glycol, triethylene glycol, propylene gylcol, dipropylene glycol, neopentyl glycol, butylene glycol, 2,2-dimethyl-3-hydroxypropyl 2,2-dimethyl-3-hydroxypropionate, 2,3-dibromo-1,4-but-2-ene diol, bisphenol-A and the ethylene oxide and/or propylene oxide adducts thereof, 2,2-dihydroxymethylpropionic acid, trimethylol ethane, trimethylol propane, pentaerythritol, dipentaerythritol, glycerine, sorbitol, hydrogenated bisphenol-A; 1,1-dihydroxy methane cyclohexane, 2,2'-dihydroxymethylbicyclo[2.2.1]heptane, 1,5-pentane diol, decane diol, and the like. Many other non-volatile low molecular weight diols having a molecular weight of from 62 to about 1000 are known and can be used; the above enumeration is illustrative only.

Further, one can have present any of the known polycaprolactone polyols that are commercially available and that are fully described, for example in U.S. Pat. No. 3,169,945. As described in this patent the polycaprolactone polyols are produced by the catalytic polymerization of an excess of a caprolactone and an organic polyfunctional initiator having at least two reactive hydrogen atoms. The method for producing the polycaprolactone polyols is of no consequence and the organic functional initiators can by any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3 methyl-1-5-pentanediol, cyclohexanediol, 4,4'methylene-bis-cyclohexanol, 4,4'-isopropylidene bis-cyclohexanol, xylenediol, 2-(4-hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis (2-hydroxyethyl)ethylene diamine, and the like.

When the organic functional initiator is reacted with the caprolactone a reaction occurs that can be represented in its simplest form by the equation:

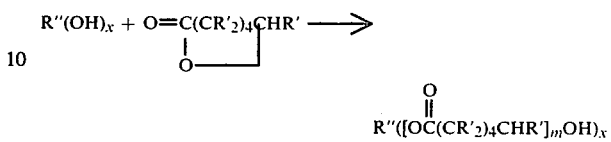

In this equation the organic functional initiator is the R"—(OH)$_x$ compound and the caprolactone is the

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from 290 to about 500 and the polycaprolactone triol compounds having an average molecular weight of from about 300 to about 1,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 6, preferably 2 to 4, hydroxyl groups.

Illustrative of useful polycaprolactones that can be used in the formulated compositions one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the polycaprolactone polyol; this figure is shown in the third column.

| TYPE A POLYCAPROLACTONE POLYOLS | | | |
|---|---|---|---|
| | Initiator | Average MW of polyol | Average No. of CPL units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4.0 |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*Average molecular weight of glycol.

The structures of the compounds in the above tabulation are obvious to one skilled in the art based on the information given. The structure of compound No. 7 is:

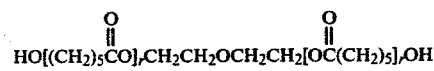

wherein the variable r is an integer the sum of r+r has an average value of 3.7 and the average molecular weight is 527. The structure of compound No. 20 is:

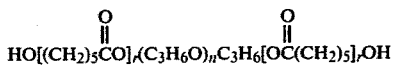

wherein the sum of r+r has an average value of 6 and the average molecular weight is 1,684. This explanation makes explicit the structural formulas of compounds 1 to 34 set forth above.

The concentration of the modified ester diol alkoxylate derivatives of the types represented by formulas III, IV, IV A, V and V A in the formulated compositions can be from 20 to 80 weight percent, preferably from 25 to 50 weight percent.

The coating compositions can also contain an organic solvent and a catalyst as optional components. Any of the conventional solvents used in the coatings industry can be used at a concentration preferably below 30 weight percent of the total weight of the coating composition. While larger amounts could conceivably be used, the use of larger amounts would destroy the high solids nature of the coating; solvents are generally added in the small amounts indicated to improve flowability during application of the coating composition to the substrate.

In some instance an acid catalyst might be desired to improve the efficiency of the melamine crosslinking reaction during curing. The concentration of the catalyst can vary from zero to about 10 weight percent based on the total weight of the coating composition. The particular catalyst used and its concentration are dependent to a degree upon its catalytic activity and the specific components present in the coatings composition. These catalysts are known to those skilled in the art and include hydrochloric acid, sulfuric acid, p-toluene sulfonic acid, dodecylbenzene sulfonic acid, phosphoric acid and its alkyl derivatives, maleic acid, trimellitic acid, phthalic acid, succinic acid, and the like.

The coatings compositions can also contain pigments, fillers and other additives conventionally present in coatings compositions in their conventional quantities. The particular ones selected are of no consequence to the basic invention. In preparing the coatings compositions, the ingredients are mixed by the conventional procedures used in the production of paints, inks or coatings compositions. These procedures are so well known to those skilled in the art that they do not require further discussion here.

The coatings compositions are applied to a surface or substrate by conventional means and then thermally cured by heating at a temperature of about 125° to 250° C., preferably from 150° to 200° C. for a period of time sufficient to obtain a dry film. Generally, this time will range from about one to 30 minutes, preferably from 10 to 20 minutes. The components present in a particular high solids coating composition will determine the temperature and time that will be required to obtain an adequate cure and a good film coating.

The coatings compositions of this invention are high solids coatings compositions and they can contain as much as 90 weight percent or more solids therein. Generally the total solids content of the coatings compositions of this invention range from about 70 to 90 weight percent of the total weight of the coating composition.

Modified Latex Compositions

It has also been found that the modified ester diol alkoxylate derivatives of the types represented by formulas III, IV, IV A, V and V A can be added to latex compositions to improve the properties of the latexes; in particular acrylic latexes.

The latexes that can be used are known to those skilled in the art and include acrylic acid and methacrylic acid derived latexes as well as those latexes derived from their esters. These latexes are commercially available and are known to be copolymers of two or more monomers such as methyl methacrylate, styrene, methyl acrylate, ethyl acrylate, butyl acrylate, 2-ethylhexyl acrylate, butyl methacrylate, methacrylic acid, acrylic acid, 2-hydroxyethyl acrylate, vinyl chloride, vinyl acetate, acrylamide, 2-hydroxypropyl acrylate, isobutoxymethyl acrylamide, maleic acid, glycidyl acrylate, vinylidene chloride, vinyl ethyl ether, butadiene, acrylonitrile, diethyl maleate, vinyl ethyl ketone, and the like. Illustrative of copolymer latexes are vinyl chloride/vinyl acetate/methacrylic acid, stryene/ethyl acrylate/methacrylic acid, methyl acrylate/styrene/vinyl acetate/methacrylic acid, and any other known latex.

The amount of said modified ester diol alkoxylate derivative that can be added to the latex can vary from about 5 to about 50 weight percent, based on the total solids content of the latex, preferably from 10 to 20 weight percent. It is added to the latex and stirred in by conventional means to obtain uniform distribution therein. The latex formulation can also contain other components generally present in latex coating compositions such as, surfactants, antifoams, bactericides, mildewicides, other coalescing acids, freeze-thaw additives, light stabilizers, and the like. These are well known to those skilled in the art, as are the amounts thereof required in latex coatings, and do not need extensive description or discussion herein to enable one skilled in the art to understand their use.

The latex coating compositions are applied to a substrate by the known conventional methods. They are cured by heating at a temperature of about 125° to 250° C., preferably from 150° to 200° C. for a period of time sufficient to obtain a dry film. Generally, this time will range from about one to 30 minutes, preferably from 10 to 20 minutes. The components present in a particular latex coating composition used will determine the temperature and time that will be required to obtain an adequate cure and a good film coating.

In the following examples the products were evaluated according to the following procedures.

Crosshatch adhesion refers to a test using 10 parallel, single-edge, razor blades to scribe test films with 2 sets of perpendicular lines in a crosshatch pattern. Ratings are based on the amount of film removed after applying and subsequently pulling a contact adhesive tape (Scotch Brand 606) away from the surface of a scribed coating at a 90 degree angle in a fast, rapid movement. It is important to carefully apply and press the tape to the scribed coating to eliminate air bubbles and provide a good bond because adhesion is reported as the percent of film remaining on the substrate with a 100 percent rating indicating complete adhesion of the film in the substrate.

Solvent resistance is a measure of the resistance of the cured film to attack by solvents, usually acetone or methyl ethyl ketone, and is reported in the number of double rubs or cycles of solvent soaked cheese cloth required to remove one-half of a film from the test area. The test is performed by stroking the film with an acetone saturated cheese cloth until that amount of film coating is removed. The number of cycles required to remove this amount of coating is a measure of the coating solvent resistance. Values greater than 100 are reported as 100 which means less than one-half the film was removed after 100 double rubs.

Reverse impact resistance measures the ability of a given film to resist rupture from a falling weight. A Gardner Impact Tester using an eight-pound dart is used to test the films cast and cured on the steel panel. The dart is raised to a given height in inches and dropped onto the reverse side of a coated metal panel. The inches times pounds, designated inch-pounds, absorbed by the film without rupturing is recorded as the reverse impact resistance of the film.

In this application, the following definitions define certain compounds that are used in the examples:

Silicone Surfactant I is

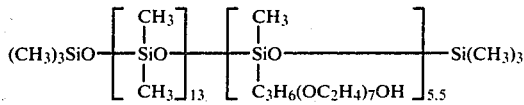

Epoxide A is 3,4-epoxycyclohexylmethyl-3,4-epoxycyclohexane carboxylate.

The following experiments show the production of ester diol alkoxylates II.

Preparation Of Ester Diol Alkoxylates II

Experiment A

A reactor was charged with 408 grams of freshly stripped solid 2,2-dimethyl-3-hydroxypropyl 2,2-dimethyl-3-hydroxypropionate and 1.39 grams of potassium metal as catalyst and heated to liquify the solid. The reactor was purged with nitrogen and then over a 10 hours addition period 528 grams of ethylene oxide were added while maintaining a temperature of from 106° to 114° C. After all of the ethylene oxide had been added, the reaction was continued at 114° C. for 30 minutes to completion. The reaction product was neutralized with 1.69 grams of acetic acid and vacuum stripped at 60° C. and 1 mm of Hg pressure. The liquid ester diol ethoxylate recovered weighed 922 grams as the residue product containing a minor amount of by-products.

The ester diol alkoxylate produced had an average of about six (x+y of Formula II) ethyleneoxy units in the molecule. The average molecular weight was 480, the Brookfield viscosity was 194 cps. at 26° C. (No. 3 spindle, 100 rpm.), the specific gravity was 1.079 g/cc and the Gardner color was less than 2. The water dilutability was 250. Water dilulability defines the grams of water that can be added to 100 grams of the ester diol alkoxylate to achieve a haze point.

Experiment B

Following the procedure similar to that described in Experiment A, 792 grams of ethylene oxide and 612 grams of 2,2-dimethyl-3-hydroxypropyl 2,2-dimethyl-3-hydroxypropionate were reacted using 2.1 grams of potassium catalyst. The ethylene oxide feed time was about 11 hours.

The liquid ester diol ethoxylate residue product produced weighed 1,391 grams; it had an average of about six ethyleneoxy units in the molecule. The average molecular weight was 477, the Brookfield viscosity was 200 cps. at 24.5° C. (No. 3 spindle, 100 rpm), the specific gravity was 1.08 g/cc and the Pt/Co color was 60. Water dilutability was 296.

Experiment C

Following the procedure similar to that described in Experiment A, 528 grams of ethylene oxide and 612 grams of 2,2-dimethyl-3-hydroxypropyl 2,2-dimethyl-3-hydroxypropionate were reacted using 1 gram of potassium as catalyst. The ethylene oxide feed time was about 9 hours.

The liquid esterdiol ethoxylate residue product produced weighed 1,128 grams; it has an average of about four ethyleneoxy units in the molecule. The average molecular weight was 392, the Brookfield viscosity was 168 cps. at 27° C. (No. 3 spindle, 100 rpm), the specific gravity was 1.07 g/cc and the Pt/Co color was 40. Water dilutability was 200.

Experiment D

Following the procedure similar to that described in Experiment A 220 grams of ethylene oxide and 510 grams of 2,2-dimethyl-3-hydroxypropyl 2,2-dimethyl-3-hydroxypropionate were reacted using 1.1 grams of potassium as catalyst. The ethylene oxide feed time was about 5 hours.

The liquid ester diol ethoxylate residue product produced weighed 730 grams; it had an average of about two ethyleneoxy units in the molecule. The average molecular weight was 295, the Brookfield viscosity was 285 cps at 25° C. (No. 3 spindle, 100 rpm) and the Pt/Co color was 75. Water dilutability was 86.

Experiment E

A stainless steel autoclave was charged with 3,011 grams of solid 2,2-dimethyl-3-hydroxypropyl 2,2-dimethyl-3-hydroxypropionate and 18 grams of boron trifluoride etherate and the contents were heated to 60° C. Then the autoclave was pressured to 10 psi with nitrogen and the ethylene oxide feed was started. A total of 2,604 grams of ethylene oxide was added over a period of about six hours while maintaining the reactor temperature of 65° to 68° C. and the pressure between 10 and 30 psi. After all the ethylene oxide had been added the temperature was maintained at 65° C. until no ethylene oxide pressure remained in the reactor. The product was cooled to 40° C.; 2 weight percent of magnesium silicate neutralizing agent was added and the mixture was stirred at 40° C. for one hour. The temperature was raised to 90° C. and held while a vacuum was applied to remove volatile products. This vacuum was continued until the pressure in the reactor reached 5 mm. of mercury. The clear/colorless product was pressure filtered to remove insolubles. There was recovered 5,494 grams of the liquid ester diol ethoxylate residue product having an average of about four ethyleneoxy units in the molecule. The average molecular weight was 382, the Cannon Fenske viscosity was 90 cks at 100° F. and the Pt/Co color was 30; it had an acid value of 0.06 percent as acetic acid. Gas chromatographic analysis indicated that the product was free of neopentyl glycol and its adducts.

In a similar manner the mixed ester diol ethoxylate/propoxylate is produced using a mixture of ethylene oxide and propylene oxide as the feed material. Likewise, the ethoxylate/styroxylate is produced.

Experiment F

Following a procedure similar to that described in Experiment A, 204 grams of 2,2-dimethyl-3-hydroxypropyl 2,2-dimethyl-3-hydroxypropionate and 440 grams of ethylene oxide were reacted at 99° to 115° C. using 1.5 grams of boron trifluoride etherate as the catalyst. The ethylene oxide feed time was about 4.5 hours and the mixture was heated an additional 0.75 hours after completion of the addition. Then 13 grams of magnesium silicate were added and the mixture was stirred overnight at 50° to 65° C. It was filtered, then stripped at 100° C. for one hour to a pressure of 5 mm. Hg.

The liquid ester diol ethoxylate residue product produced weighed 602.4 grams; it had an average of about 10 ethyleneoxy units in the molecule. The Brookfield viscosity was 193 cps at 30° C. (No. 3 spindle, 100 rpm) the specific gravity was 1.046 g/cc and the Gardner color was 1.5. Water dilutability was 15.6.

Experiment G

Following the procedure described in Experiment F, 204 grams of 2,2-dimethyl-3-hydroxypropyl 2,2-dimethyl-3-hydroxypropionate was reacted with 440 grams of ethylene oxide using 1.5 grams of boron trifluoride etherate as the catalyst. The ethylene oxide addition time was about 7.5 hours.

The liquid ester diol ethoxylate residue product produced weighed about 629 grams after filtering and stripping. It had an average of about 10 ethyleneoxy units in the molecule. The Cannon Fenske viscosity at 100° F. was 103.4 cks., the specific viscosity was 1.046 g/cc and the Gardner color was 1. Water dilutability was 15.4.

Experiment H

Following the procedure described in Experiment F, 125 grams of 2,2-dimethyl-3-hydroxypropyl 2-2dimethyl-3-hydroxypropionate was reacted at 48° to 132° C. with a total of 502 grams of ethylene oxide using a total of 1.3 grams of potassium as the catalyst. The ethylene oxide feed time was about 9.5 hours. At the completion of the feed 11.9 grams of magnesium silicate were added and the mixture was stirred for one hour and then cooled. The ester diol ethoxylate was filtered hot and stripped under vacuum.

The stripped ester diol ethoxylate residue product recovered weighed about 585.3 grams. It had an average of about 19 ethyleneoxy units in the molecule. The Cannon Fenske viscosity was 115.5 cks at 100° F. On standing it solidified at 25° C. and melted at about 27° C.

Experiment I

In a manner similar to that described in Experiment A, 805 grams of 2,2-dimethyl-3-hydroxypropyl 2,2-dimethyl-3-hydroxypropionate and 8 grams of boron trifluoride etherate were melted at 60° C. in a reaction flask. Over a period of about 1.75 hours a total 811 grams of propylene oxide were added at a temperature of 57° to 60° C. The reaction mixture was stirred about another 2 hours; 32.3 grams of magnesium silicate were added and stirred at about 70° C. for about 1.5 hours. It was then stripped at 70° C. for 0.5 hours at 4–5 mm. of mercury and filtered. The liquid ester diol propoxylate residue product was clear and colorless and weighed 1,508 grams. It had an average of about 4 propyleneoxy units in the molecule.

The following examples serve to further define this invention; parts are by weight unless otherwise indicated.

PREPARATION OF ANHYDRIDE MODIFIED ESTER DIOL ALKOXYLATES III AND FORMULATIONS THEREOF

EXAMPLE 1

Part A

A glass-lined autoclave was charged with 429.47 parts of 2,2-dimethyl-3-hydroxypropyl 2,2-dimethyl-3-hydroxypropionate and 2.4 parts of boron trifluoride etherate. The mixture was heated to 55° C. and 370.5 parts of ethylene oxide were added over a period of about 13 hours. This mixture was then held at this temperature for four more hours. Then, 2 percent by weight of magnesium silicate was added and the contents were heated to 90° C. and stirred for 4 hours. Thereafter the pressure was reduced to 20 mm Hg and the product was stripped for four hours to remove volatiles. Atmospheric pressure was restored with nitrogen, the contents were cooled to 50° C., and transferred to a storage autoclave. Five parts of filter aid were added, the contents were mixed for 30 minutes, and then filtered and stored. A second batch was made in the same manner and both batches were blended by placing the materials in a large autoclave, heating the contents to 90° C., and stripping the product 4 hours at 5 mm Hg. There was obtained a large quantity of the liquid ester diol ethoxylate having an average of about 4 ethyleneoxy units in the molecule.

Part B

A 236.7 grams portion of the above liquid ester diol ethoxylate (Part A) was charged to a reactor together with 163.3 grams of phthalic anhydride and 96 grams of 2-ethoxyethyl acetate as the solvent. The mixture was stirred and heated at 140° C. for 30 minutes. The anhydride modified ester diol ethoxylate III had the following average structural formula:

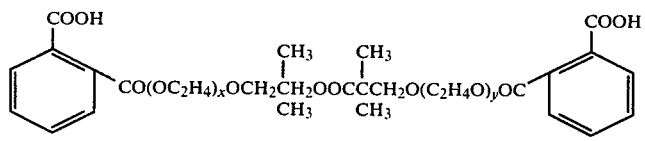

in which the sum of x and y have an average value of about 4. The mixture also contained unreacted ester diol ethoxylate. It had a Brookfield viscosity of 386 cps at 25° C. and an acid number of 124 mgm. KOH/gm.

Part C

A coating composition was prepared by mixing 10 grams of the above anhydride modified ester diol ethoxylate (Part B), 10 grams of hexamethoxymethylmelamine, 0.5 gram of N,N-dimethylethanolamine, 3 grams of distilled water, and 0.05 gram of Silicone Surfactant I. Films were prepared by casting the above composition on steel panels with a No. 40 wire-wound rod and thermally curing in a circulating air oven. Curing for 20 minutes at 220° F. afforded no cure. Curing for 20 minutes at 250° F. produced films with a 4B pencil hardness, 43 acetone rubs, and greater than 320 inch-pounds reserve impact resistance. In this composition, cure was achieved even in the absence of catalyst.

EXAMPLE 2

A coating composition was prepared by mixing 10 grams of the anhydride modified ester diol alkoxylate (Part B) of Example 1, 10 grams of hexamethoxymethylmelamine as crosslinker, 0.5 gram of N,N-dimethylethanolamine, 3 grams of distilled water, 0.05 gram of Silicone Surfactant I, and 0.2 gram of a 40 percent solution of p-toluenesulfonic acid dissolved in an organic solvent as the catalyst. Cured films were prepared as described in Example 1, Part C. Curing for 20 minutes at 220° F. afforded films with 100 acetone rubs, F pencil hardness, and high reverse impact resistance. A film cured at 250° F. for 20 minutes achieved a 2H pencil hardness, 100 acetone rubs, and high reverse impact resistance. The improved properties obtained by the use of a cure catalyst are clearly evident.

EXAMPLE 3

A series of high solids coating compositions was produced by mixing 10 grams of the anhydride modified ester diol ethoxylate (Part B) of Example 1, Epoxide A, stannous octoate catalyst, 0.1 gram of Silicone Surfactant I, and 1 gram of xylene. Films were prepared from the 86 weight percent solids solution as described in Example 1 Part C. Curing at 200° F. for 20 minutes produced clear dry films. The quantities of reactants used and properties of the cured films are tabulated below; all the films were smooth with high gloss.

| | Experiments | | | |
|---|---|---|---|---|
| | A | B | C | D |
| Formulation | | | | |
| Example 1, Part B Product, g | 10.0 | 10.0 | 10.0 | 10.0 |
| Epoxide A, g | 15.0 | 10.0 | 7.5 | 6.0 |
| Stannous Octoate, g | 0.23 | 0.18 | 0.15 | 0.14 |
| Coating Properties | | | | |
| Reverse Impact in-lbs. | 5 | 250 | >320 | 300 |
| Acetone Rubs | 100 | 100 | 92 | 68 |
| Pencil Hardness | H | 2H | 2H | 2H |

Formulation B represents the optimum thermoset characteristics. The C and D formulations describe the decrease in thermoset characteristics that occur when the amount of epoxide is decreased and the resultant high impact and hardness that is achieved at the cure conditions used. Formulation A is a hard coating with excellent thermoset characteristics.

EXAMPLE 4

A pigmented high solids coating composition was produced by blending 100 grams of the anhydride modified ester diol ethoxylate of Example 1, 180 grams of titanium dioxide pigment, 3 grams of stannous octoate catalyst, 1 gram of Silicone Surfactant I, and 40 grams of xylene in a ball mill overnight. Subsequently, 61.73 grams of Epoxide A and 30 grams of xylene was mixed with 200 grams of the above mixture to afford a 77 weight percent solids coating composition with a Brookfield viscosity of 180 centipoises at 25° C. Films prepared according to the procedure described in Example 1 were cured at 220° F. for 20 minutes. The film produced passed 100 acetone rubs, had high gloss, had excellent adhesion and achieved a pencil hardness of 2 H.

EXAMPLE 5

Part A

A 360 grams portion of the liquid ester diol ethoxylate of Part A of Example 1 was reacted with 40 grams of phthalic anhydride for 30 minutes at 140° C. to produce a phthalic modified ester diol ethoxylate having a Brookfield viscosity of 500 cps and an acid number of 40 mgm. KOH/gm.

In a similar manner succinic anhydride can replace phthalic anhydride.

Part B

A coating composition was produced by mixing 100 grams of the above product of Part A with 100 grams of hexamethoxymethylmelamine, 140 grams of titanium dioxide, and 25 grams of 2-ethoxyethyl acetate. The mixture was mixed overnight in a ball mill. Then a 158.5-gram portion was separated and mixed with 1 gram of phosphoric acid catalyst and 25 additional grams of 2-ethoxyethyl acetate. Films prepared by the procedure described in Example 1 were cured for 20 minutes at 300° F. The film had good solvent resistance (more than 100 acetone rubs), good adhesion, and 75 inch-pounds reverse impact resistance.

EXAMPLE 6

Part A

A 320 grams portion of the liquid ester diol ethoxylate of Part A of Example 1 was reacted with 80 grams of phthalic anhydride for 30 minutes at 140° C. to produce a phthalic modified ester diol ethoxylate having a Brookfield viscosity of 1,690 cps and an acid number of 77 mgm. KOH/gm.

Part B

A coating composition was produced by charging 100 grams of the product of Part A, 100 grams of hexamethoxymethylmelamine, 140 grams of titanium dioxide, and 30 grams of 2-ethoxythyl acetate to a ball mill and rolling it overnight. Then a 168.5-gram portion of the mixture was blended with 1.5 grams of phosphoric acid, 0.42 gram of Tinuvin 770 ® (a UV stabilizer marketed by Ciba-Geigy), 0.11 gram of Irganox 1010 ® (a branched phenol antioxidant marketed by Ciba-Geigy), 50 grams of 2-ethoxyethyl acetate, and 4.55 grams of a polycaprolactone triol having an average molecular weight of 300 and an average hydroxyl number of 560. Films were prepared according to the procedure described in Example 1 and cured for 20 minutes at 250° F. The film produced was solvent resistant (more than 100 acetone rubs), had a pencil hardness of 2 B, and passed 50 inch-pounds reverse impact resistance.

EXAMPLE 7

Part A

A 280 grams portion of the liquid ester diol ethoxylate of Part A of Example 1 was reacted with 120 grams of phthalic anhydride for 30 minutes at 140° C. to produce a phthalic modified ester diol ethoxylate having a Brookfield viscosity of 18,280 cps and an acid number of 115 mgm. KOH/gm.

Part B

A coating composition was produced by charging 100 grams of the product of Part A, 100 grams of hexamethoxymethylmelamine, 140 grams of titanium dioxide, and 40 grams of 2-ethoxyethyl acetate to a ball mill and rolling the mixture overnight. Then a 173 gram portion of the mixture was blended with 1.5 grams of phosphoric acid, 40 grams of 2-ethoxyethyl acetate, and 4.5 grams of the polycaprolactone triol used in Example 6, Part B. A film was prepared according to the procedure described in Example 1 and cured for 20 minutes at 250° F. The film produced was solvent resistant (more than 100 acetone rubs) and had a reverse impact resistance of 200 inch-pounds.

PREPARATION OF ISOCYANATE MODIFIED ESTER DIOL ALKOXYLATES IV AND IV A AND FORMULATIONS THEREOF

EXAMPLE 8

Part A

A series of isocyanate modified ester diol ethoxylates was prepared by reacting the ester diol ethoxylate of Part A of Example 1 with 3-isocyanatomethyl-3,5,5-trimethylcyclohexylisocyanate (IPDI) at 45° C. for about 5 hours. The resulting products contained unreacted ester diol ethoxylate and its hydroxyl terminated diurethane dervative. The quantities reacted and properties of the product mixtures produced are tabulated below:

| Run | (1) | (2) | (3) | (4) |
|---|---|---|---|---|
| Example 1, Part A, g, | 95 | 90 | 80 | 85 |
| IPDI, g | 5 | 10 | 20 | 15 |
| Stannous octoate, g | 0.1 | 0.1 | 0.1 | 0.1 |
| Product Properties | | | | |
| Brookfield viscosity, cps at 25° C. | 512 | 1,588 | 33,000 | 6,000 |
| Water dilutability, gms. water/100 gms. product to haze point. | 166 | 78 | 21 | — |

Part B

Aqueous coating compositions were formulated and cured following the procedures described in Example 1, Part C. The data are summarized in the following table:

| Coating | 1 | | 2 | | 3 | | 4 | | 5 | | 6 | |
|---|---|---|---|---|---|---|---|---|---|---|---|---|
| Formulation, parts | | | | | | | | | | | | |
| Example 8, Run (1) | 10 | | — | | — | | — | | — | | — | |
| Example 8, Run (2) | — | | 10 | | 12 | | 8 | | — | | — | |
| Example 8, Run (3) | — | | — | | — | | — | | 10 | | 12 | |
| Example 8, Run (4) | — | | — | | — | | — | | — | | — | |
| Hexamethoxymethylmelamine | 10 | | 10 | | 8 | | 6 | | 10 | | 8 | |
| p-Toluenesulfonic acid | 1.0 | | 1.0 | | 1.0 | | 1.0 | | 1.0 | | 1.0 | |
| Water | 2.0 | | 2.0 | | 3.0 | | 3.0 | | 3.0 | | 3.0 | |
| Silicone Surfactant I | 0.1 | | 0.1 | | 0.1 | | 0.1 | | 0.1 | | 0.1 | |
| Cure Temp., °F. | 200 | 250 | 200 | 250 | 200 | 250 | 200 | 250 | 200 | 250 | 200 | 250 |
| Coating Properties | | | | | | | | | | | | |
| Reverse Impact, in.-lbs. | 125 | 5 | 125 | 5 | 100 | 15 | 5 | 25 | 320 | 320 | 320 | 5 |
| Acetone Rubs | 100 | 100 | 100 | 100 | 100 | 100 | 100 | 100 | 100 | 100 | 100 | 100 |
| Pencil Hardness | 2H | 4H | 2H | 4H | 2H | 3H | 2H | F | 2B | 2H | 3H | 4H |
| % Adhesion Failure | 100 | 0 | 100 | 0 | 90 | 75 | 90 | 95 | 0 | 0 | 30 | 20 |
| Wet Pencil Hardness* | — | F | — | 3B | — | B | — | 4B | — | HB | — | HB |

| Coating | 7 | 8 | 9 | 10 | 11 | 12 |
|---|---|---|---|---|---|---|
| Formulation, parts | | | | | | |
| Example 8, Run (1) | — | — | — | — | — | — |
| Example 8, Run (2) | — | — | — | — | — | — |
| Example 8, Run (3) | 8 | 6 | 10 | — | — | — |
| Example 8, Run (4) | — | — | — | 8 | 10 | 12 |
| Hexamethoxymethylmelamine | 6 | 14 | 10 | 12 | 10 | 8 |
| p-Toluenesulfonic acid | 1.0 | 1.0 | 1.0 | 1.0 | 1.0 | 1.0 |
| Water | 3.0 | 3.0 | 3.0 | 3.0 | 3.0 | 3.0 |

-continued

| | | | | | | | | | | | | |
|---|---|---|---|---|---|---|---|---|---|---|---|---|
| Silicone Surfactant I | 0.1 | | 0.1 | | 0.1 | | 0.1 | | 0.1 | | 0.1 | |
| Cure Temp., °F. | 200 | 250 | 200 | 250 | 200 | 250 | 200 | 250 | 200 | 250 | 200 | 250 |
| Coating Properties | | | | | | | | | | | | |
| Reverse Impact, in.-lbs. | 300 | 150 | 5 | 5 | 200 | 5 | 75 | 5 | 125 | 5 | 175 | 5 |
| Acetone Rubs | 100 | 100 | 100 | 100 | 100 | 100 | 100 | 100 | 100 | 100 | 100 | 100 |
| Pencil Hardness | 2H | H | 4H | 5H | 4H | 5H | 3H | 5H | 3H | 5H | 2H | 4H |
| % Adhesion Failure | 15 | 100 | 0 | 0 | 0 | 0 | 15 | 2 | 2 | 5 | 2 | 95 |
| Wet Pencil Hardness* | — | 4B | H | H | H | H | F | H | B | 2H | 2B | H |

*Wet pencil hardness was determined after immersing the samples in 50° C. water for 16 hours.

EXAMPLE 9

Part A

A 160 grams portion of the ester diol ethoxylate of Part A of Example 1 was reacted with 40 grams of IPDI for 2 hours at about 50° C. in contact with 0.2 gram of stannous octoate as catalyst to produce a mixture containing unreacted ester diol ethoxylate and its hydroxyl terminated diurethane derivative.

Part B

To the above reaction mixture there were added 35.3 grams of phthalic anhydride and 58.8 grams of 2-ethoxyethyl acetate. The mixture was heated for 30 minutes at 140° C. to produce the phthalic anhydride partially capped reaction product mixture.

Part C

A series of coating compositions was prepared and cured by the procedures described in Example 1. Coatings 1 to 4 were cured for 20 minutes at 350° F.; coating 5 was cured at 250° F. The composition and properties are tabulated below:

| Coating | 1 | 2 | 3 | 4 | 5 |
|---|---|---|---|---|---|
| Formulation, parts | | | | | |
| Example 9, Part B | 8 | 10 | 12 | 10 | 10 |
| Hexamethoxymethyl-melamine | 12 | 10 | 8 | 10 | 10 |
| Silicone Surfactant I | 0.1 | 0.1 | 0.1 | 0.1 | 0.1 |
| p-Toluenesulfonic acid | 0 | 0 | 0 | 1.25 | 1.25 |
| Ethoxyethyl Acetate | 2.0 | 2.0 | 2.0 | 2.0 | 2.0 |
| Coating Properties | | | | | |
| Reverse Impact, in-lbs. | 300 | 300 | 300 | 5 | 15 |
| Acetone Rubs | 14 | 100 | 100 | 100 | 100 |
| Pencil Hardness | 4B | HB | HB | 5H | 3H |
| Adhesion, % | 100 | 100 | 100 | 100 | 100 |

PREPARATION OF EPOXIDE MODIFIED ESTER DIOL ALKOXYLATES V AND V A AND FORMULATIONS THEREOF

Example 10

Part A

A 348 grams portion of the liquid ester diol ethoxolate of Part A of Example 1, 52 grams of Epoxide A and 1.2 grams of stannous octoate (added in two portions) were reacted at 150° C. for 10 hours. The epoxide modified ester diol ethoxolate produced contained 0.68 weight percent unreacted Epoxide A in the mixture.

Part B

A series of aqueous coating compostion was produced and cured following the procedures described in Example 1. The data are summarized in the following table:

| Coating | 1 | | 2 | | 3 | | 4 | |
|---|---|---|---|---|---|---|---|---|
| Formulation, parts | | | | | | | | |
| Example 10, Part A | 8.0 | | 10.0 | | 12.0 | | 14.0 | |
| Hexamethoxymethylmelamine | 12.0 | | 10.0 | | 8.0 | | 6.0 | |
| p-Toluenesulfonic acid | 1.0 | | 1.0 | | 1.0 | | 1.0 | |
| Distilled Water | 2.0 | | 2.0 | | 2.0 | | 2.0 | |
| Silicone Surfactant I | 0.1 | | 0.1 | | 0.1 | | 0.1 | |
| Cure Temp., °F. | 200 | 250 | 200 | 250 | 200 | 250 | 200 | 250 |
| Coating Properties | | | | | | | | |
| Reverse Impact, in-lbs. | 5 | <5 | <5 | <5 | 25 | <5 | 50 | 25 |
| Acetone Rubs | 100 | 100 | 100 | 100 | 100 | 100 | 100 | 100 |
| Pencil Hardness | 5H | 5H | 4H | 5H | 2H | 5H | F | H |

The results indicate that hard, thermoset coatings were prepared.

EXAMPLE 11

Part A

A mixture of 300 grams of the epoxide modified ester diol ethoxalate of Part A of Example 10, 75 grams of phthalic anhydride and 94 grams of 2-ethoxyethyl acetate was heated and reacted for 30 minutes at 140° C. to produce the phthalic anhydride capped derivative of the epoxide modified ester diol ethoxylate having a Brookfield viscosity of 500 cps at 25° C.

Part B

A coating composition was produced by blending 12.5 grams of the capped product of Part A above, 10 grams of hexamethoxymethylmelamine, 0.1 gram of Silicone Surfactant I, and 2 grams of 2-ethoxyethyl acetate. Films prepared according to the procedure described in Example 1 were cured for 20 minutes at 350° F. The cured films obtained achieved a B pencil hardness, 100 acetone rubs, and 320 inch-pounds of reverse impact resistance.

PREPARATION OF MISCELLANEOUS FROMULATIONS USING POLYOL AND LATEXES

Example 12

A series of coating compositions was produced using various anhydride modified ester diol ethoxylates produced supra in conjunction with a low molecular weight polyol. The formulations and their coating properties are tabulated below; all coatings were cured for 20 minutes at 250° F.

| Coating | 1 | 2 | 3 | 4 | 5 | 6 |
| --- | --- | --- | --- | --- | --- | --- |
| Formulation, parts | | | | | | |
| Example 5, Part A Adduct | 8.5 | 7.0 | 0 | 0 | 0 | 0 |
| Example 6, Part A Adduct | 0 | 0 | 8.5 | 7.0 | 0 | 0 |
| Example 7, Part A Adduct | 0 | 0 | 0 | 0 | 8.5 | 7.0 |
| Trimethylolpropane (TMP) | 1.5 | 3.0 | 1.5 | 3.0 | 1.5 | 3.0 |
| Hexamethoxymethyl-melamine | 10 | 10 | 10 | 10 | 10 | 10 |
| Phosphoric Acid | 0.2 | 0.2 | 0.2 | 0.2 | 0.2 | 0.2 |
| Silicone Surfactant I | 0.1 | 0.1 | 0.1 | 0.1 | 0.1 | 0.1 |
| Ethoxyethyl Acetate | 2.0 | 2.0 | 2.0 | 2.0 | 3.0 | 3.0 |
| Coating Properties | | | | | | |
| Reverse Impact, in-lbs. | 100 | <5 | 25 | <5 | 75 | <5 |
| Acetone Rubs | 100 | 100 | 100 | 100 | 100 | 100 |
| Pencil Hardness | 3H | 5H | 3H | 5H | 3H | 6H |
| Adhesion, % | 100 | 100 | 100 | 100 | 100 | 100 |

All films were clear, smooth, glossy, and thermoset in character. Adhesion was excellent. The formulations containing the large amount of TMP were very hard and as a result had minimal impact resistance.

Example 13

Coating compositions were produced similar to those described in Example 12 but containing higher concentrations of the Adducts and decreased trimethylolpropane concentrations. The coatings were cured at 250° F. for 20 minutes. The results are tabulated below.

| Coating | 1 | 2 | 3 | 4 | 5 | 6 | 7 | 8 |
| --- | --- | --- | --- | --- | --- | --- | --- | --- |
| Formulation, parts | | | | | | | | |
| Example 5, Part A Adduct | 9.0 | 9.5 | 0 | 0 | 0 | 0 | 0 | 0 |
| Example 6, Part A Adduct | 0 | 0 | 9.0 | 9.5 | 9 | 9 | 0 | 0 |
| Example 7, Part A Adduct | 0 | 0 | 0 | 0 | 0 | 0 | 9.5 | 9.0 |
| Trimethylolpropane | 1.0 | 0.5 | 1.0 | 0.5 | 1.0 | 1.0 | 1.0 | 0.5 |
| Hexamethoxymethylmel-amine | 10 | 10 | 10 | 10 | 6.7 | 15 | 10 | 10 |
| Phosphoric acid | 0.1 | 0.1 | 0.1 | 0.1 | 0.1 | 0.1 | 0.1 | 0.1 |
| Silicone Surfactant I | 0.2 | 0.2 | 0.2 | 0.2 | 0.2 | 0.2 | 0.2 | 0.2 |
| Ethoxyethyl Acetate | 2.0 | 2.0 | 2.0 | 2.0 | 2.0 | 2.0 | 2.0 | 2.0 |
| Coating Properties | | | | | | | | |
| Reverse Impact, in-lbs. | 25 | 50 | 50 | 25 | 25 | 25 | 50 | 75 |
| Acetone Rubs | ← | ← | ← | 100 | → | → | → | → |
| Pencil Hardness | 2H | 2H | 2H | 2H | 3H | H | 3H | 2H |
| Adhesion, % | ← | ← | ← | 100 | → | → | → | → |

Thus good overall coating properties were obtained in all instances. Adhesion was excellent.

Example 14

A pigmented composition was produced by mixing 90 grams of the product of Part A of Example 6, 100 grams of hexamethoxymethylmelamine, 10 grams of the polycaprolactone triol used in Part B of Example 6, 140 grams of titanium dioxide, and 40 grams of 2-ethoxyethyl acetate and rolling overnight in a ball mill. A 19-gram portion of the mixture was blended with 0.2 gram of stannous chloride and 1 gram of 2-ethoxyethyl acetate to produce a pigmented coating composition. A film was prepared according to the procedure described in Example 1 and cured for 20 minutes at 200° F. The film produced was solvent resistant (more than 100 acetone rubs), impact resistant (more than 320 inch-pounds), and had a B pencil hardness.

EXAMPLE 15

A series of coating compositions was produced by blending a styrene/ethyl acrylate/methacrylic acid/2-hydroxyethyl acrylate latex composition having a total solids of 43 weight percent with the product of Part A of Example 6. The aqueous latex was modified to improve its film-forming properties and to establish that the anhydride modified ester diol alkoxylates act as a reactive coalescing aid. The formulations were produced by mixing the components described in the following table at room temperature. The product of Part A of Example 6 was diluted to 50 weight percent solids with distilled water and neutralized to a pH of 7.4 with N,N-dimethylethanolamine.

| Run | 1 | 2 | 3 | 4 | 5 | 6 | 7 |
| --- | --- | --- | --- | --- | --- | --- | --- |
| Composition, solids | | | | | | | |
| Latex, gms. | 10 | 10 | 10 | 10 | 10 | 10 | 10 |
| Example 6, Part A adduct, gms. | 0 | 0.5 | 1.0 | 1.5 | 0.5 | 1.0 | 0.5 |
| Hexamethoxymethyl-melamine | 0 | 0 | 0 | 0 | 0.5 | 0.5 | 1.0 |
| Water | 13.3 | 13.8 | 14.3 | 14.8 | 13.8 | 14.3 | 13.8 |

Films were cast on Bonderite No. 37 steel panels with a No. 60 wire-wound rod and allowed to stand under ambient conditions overnight. The films were than observed for appearance and placed in an oven for 20 minutes at 350° F. The results are reported in the following table:

| Run | 1 | 2 | 3 | 4 | 5 | 6 | 7 |
| --- | --- | --- | --- | --- | --- | --- | --- |
| Film Properties | | | | | | | |
| Appearance prior to curing | (1) | (1) | (2) | (3) | (4) | (3) | (3) |
| Appearance after cure | (1) | (1) | (2) | (3) | (4) | (3) | (3) |
| Acetone rubs, cycles | No cure | 60 | 100 | 100 | 100 | 100 | 100 |
| Reverse impact, in-lbs. | No cure | <5 | 15 | 300 | <5 | 5 | 4H |
| Pencil hardness | No cure | F | F | 2B | H | H | 300 |

(1) Heavy mud cracking
(2) Moderate mud cracking
(3) Smooth
(4) Trace of mud cracking

EXAMPLE 16

Part A

A reactor equipped with a stirrer, condenser, nitrogen inlet tube and thermometer was charged with 100 parts of the ester diol propoxylate of Experiment I and 59 parts of phthalic anhydride. The mixture was then heated to 140° C. and stirred at this temperature for 90 minutes. The anhydride modified ester diol propoxylate adduct was clear, viscous and had an acid number of 138 mgm. of KOH/gm. A 5 gram portion diluted with 15 grams of 2-ethoxyethyl acetate had a Brookfield viscosity of 460 cps at 27° C. (No. 4 spindle, 100 rpm).

Part B

A series of catalyzed coating compositions was produced, applied to steel panels using a No. 40 wire wound rod and cured. The formulations contained 0.1 gram of Silicone Surfactant I and the following components in grams:

| Formulation | A | B | C | D |
| --- | --- | --- | --- | --- |
| Part A Adduct | 10 | 10 | 10 | 10 |
| Hexamethoxymethylmelamine | 4.3 | 4.8 | 5.6 | 0 |
| Epoxide A | 0 | 0 | 0 | 10.8 |
| p-Toluenesulfonic Acid | 0.05 | 0.05 | 0.05 | 0 |

-continued

| Formulation | A | B | C | D |
|---|---|---|---|---|
| Stannous Octoate | 0 | 0 | 0 | 0.2 |
| Butyl Acetate | 3.1 | 3.2 | 3.4 | 4.9 |
| 2-Ethoxyethyl Acetate | 3.0 | 3.1 | 3.3 | 4.0 |

Formulations A, B and C were cured at 300° F. and D at 250° F. for 20 minutes. All cured coatings had reverse and front impacts greater than 320 in.-lb. and 100% crosshatch adhesion values. Formulations A, B and C passed 100 acetone rubs; formulation D, 65 acetone rubs. The pencil hardness values of formulations A, C and D were 2H, that of B was H.

Part C

A second series of formulations was prepared identical to Formulations A to D but without the addition of any p-toluenesulfonic acid or stannous octoate. These are identified as Formulations E, F, G and H respectively. In addition Formulation I was produced containing 10 parts of the Part A Adduct, 0.1 part of Silicone Surfactant I, 7 parts of butyl acetate, 6.3 parts of 2-ethoxyethyl acetate and 21 parts of bis(3,4-epoxycyclohexylmethyl) adipate. The formulations were applied to steel panels as in Part B and cured at 300° F. for 20 minutes. (Formulations H and I were also given an initial precure of 20 minutes at 250° F.). All cured coatings had reverse and front impacts greater than 320 in.-lb. and 100% crosshatch adhesion values. Formulations G, H and I passed 100 acetone rubs; formulation E, 50 acetone rubs; formulation F, 75 acetone rubs. The pencil hardness values of F, G and I were F, that of E was H and that of H was 3H.

EXAMPLE 17

A pigment grind was prepared using 100 parts of the anhydride modified ester diol ethoxylate of Example 1, Part B, 180 parts of titanium dioxide, 2 parts of stannous octanoate, 1 part of Silicone Surfactant I, and 4 parts of xylene by grinding in a ball mill.

To 161.5 parts of the pigment grind there were added 28.9 parts of bis(3,4-epoxycyclohexylmethyl) adipate, 20.35 parts of 4,4'-dicyclohexylmethane diisocyanate and 40 parts of xylene and the mixture thoroughly blended to yield a formulation having a viscosity of 180 cps at room temperature. Steel panels were spray-coated and cured at 220° F. and 250° F. to yield hard, adherent, thermoset coatings with good impact resistance and high gloss.

EXAMPLE 18

A series of coating formulations was produced containing the indicated components. They were then applied to steel panels using a No. 40 wire-wound rod and cured at 220° F. and 250° F. for 20 minutes to yield hard, adherent, thermoset coatings with generally excellent impact resistance. Each formulation contained 10 parts of the anhydride modified ester diol ethoxylate of Example 1, Part B, 0.2 part of stannous octanoate, 0.1 part of Silicone Surfactant I and 2 parts of 2-ethoxyethyl acetate in addition to the epoxides identified below.

| | Epoxide | | Isocyanate |
|---|---|---|---|
| Formulation | A | B | A |
| (a) | 3.74 | 0 | 4.07 |
| (b) | 0 | 5.78 | 4.07 |

| | Epoxide | | Isocyanate |
|---|---|---|---|
| Formulation | A | B | A |
| (c) | 7.54 | 0 | 0.5 |
| (d) | 0 | 11.55 | 0.5 |
| (e) | 11.34 | 0 | 0.5 |
| (f) | 0 | 17.3 | 0.5 |

Epoxide B = bis(3,4-epoxycyclohexyl-methyl)adipate
Isocyanate A = 4,4'-dicyclohexylmethane diisocyanate

EXAMPLE 19

A formulation was produced by blending 10 parts of the anhydride modified ester diol ethoxylate of Example 1, Part B, 5.78 parts of bis(3,4-epoxycyclohexylmethyl) adipate, 4.07 parts of 4,4'-dicyclohexylmethane diisocyanate and 0.2 part of stannous octanoate. One mil coatings were applied to a 0.5 inch by 1 inch portion of two 1 inch wide by 1.5 inches long metal strips. The two coated edges were held together with a paper clip and cured for 20 minutes at 300° F. In two replicate tests, it was found that an average tensile force applied to the two ends of the adhered strips of about 600 pounds was required to break the adhesive bond that had been formed.

EXAMPLE 20

A series of adhesive compositions was prepared, each containing 10 parts of the anhydride modified ester diol ethoxylate of Example 1, Part B, and the following components:

| Adhesive | (1) | (2) |
|---|---|---|
| Epoxide A | 0 | 10 |
| Hexamethoxymethylmelamine | 10 | 0 |
| Stannous octoate | 0 | 0.2 |
| p-Toluenesulfonic Acid | 0.2 | 0 |

Adhesive (1) required an average tensile force of 8.8 pounds to break the bond; an average tensile force of 37.5 was required with Adhesive (2).

What is claimed is:

1. An epoxide modified ester diol alkoxylate comprising the reaction product of (A) an ester diol alkoxylate of the general formula:

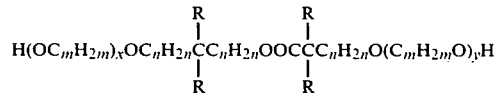

wherein m is an integer having a value of from 2 to 4, n is an integer having a value of from 1 to 5, x and y are integers each having a value of from 1 to 20 and R is an alkyl group having from 1 to 8 carbon atoms; and (B) from 0.2 to 1 mole of a diepoxide per mole of (A).

2. An epoxide modified ester diol alkoxylate as claimed in claim 1, wherein Component (B) is 3,4-epoxycyclohexylmethyl-3,4-epoxycyclohexane carboxylate.

3. An epoxide modified ester diol alkoxylate as claimed in claim 1, wherein m has a value of 2 to 3, n has a value of 1 to 3, x and y each have values of from 1 to 10 and R is an alkyl group having from 1 to 3 carbon atoms.

4. An epoxide modified ester diol alkoxylate as claimed in claim 1, wherein m has a value of 2, n has a value of 1 and R is a methyl group.

5. An epoxide modified ester diol alkoxylate as claimed in claim 1, wherein m has a value of 3, n has a value of 1 and R is a methyl group.

6. An epoxide modified ester diol alkoxylate as claimed in claim 1, wherein from 0.3 to 0.6 mole of diepoxide per mole of Component (A) is initially charged and reacted.

7. An epoxide modified ester diol alkoxylate as claimed in claim 1, wherein in said Component (A) m has a value of 2, n has a value of 1, x plus y have an average value of 4 and R is hydrogen, and said Component (B) is 3,4-epoxycyclohexylmethyl-3,4-epoxycyclohexane carboxylate.

8. An epoxide modified ester diol alkoxylate as claimed in claim 7, wherein the average value of x plus y is 2.

9. An epoxide modified ester diol alkoxylate as claimed in claim 7, wherein the average value of x plus y is 6.

10. An epoxide modified ester diol alkoxylate as claimed in claim 7, wherein the average value of x plus y is 10.

11. A high solids composition comprising an epoxide modified ester diol alkoxylate as claimed in claim 1 and additionally containing from 25 to 200 weight percent thereof of a crosslinking agent.

12. A high solids composition as claimed in claim 11, wherein said crosslinking agent is hexamethoxymethylmelamine.

13. A high solids composition as claimed in claim 11, wherein Component (B) is 3,4-epoxycyclohexylmethyl-3,4-epoxycyclohexane carboxylate.

14. A high solids composition as claimed in claim 11, wherein a low molecular weight polyol having from 2 to 6 hydroxyl groups and a molecular weight of from 62 to 1,000 is additionally present.

15. A high solids composition as claimed in claim 11, wherein a polycaprolactone polyol is additionally present.

16. An epoxide modified ester diol alkoxylate as claimed in claim 1, said alkoxylate capped with from 0.1 to 1 anhydride equivalent per hydroxyl equivalent initially charged with an intramolecular anhydride of a polycarboxylic acid.

17. A high solids composition comprising an anhydride capped epoxide modified ester diol alkoxylate as claimed in claim 16 and from 25 to 200 weight percent thereof of a crosslinking agent.

18. A high solids composition as claimed in claim 17, wherein said crosslinking agent is hexamethoxymethylmelamine.

19. A high solids composition as claimed in claim 17, wherein a low molecular weight polyol having from 2 to 6 hydroxyl groups and a molecular weight of from 62 to 1,000 is additionally present.

20. A high solids composition as claimed in claim 17, wherein a polycaprolactone polyol is additionally present.

* * * * *

UNITED STATES PATENT AND TRADEMARK OFFICE
CERTIFICATE OF CORRECTION

PATENT NO. : 4,195,160
DATED : March 25, 1980
INVENTOR(S) : Oliver W. Smith et al It is certified that error appears in the above—identified patent and that said Letters Patent is hereby corrected as shown below:

The formula on column 15, lines 13 to 20 should read as follows:

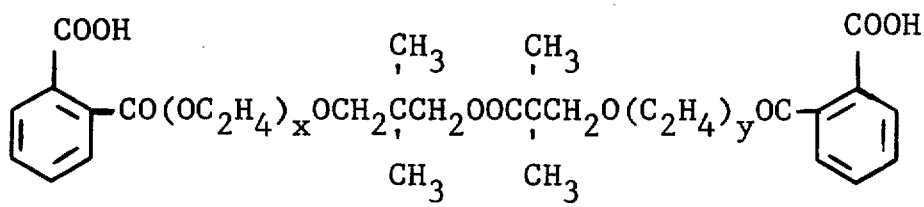

Signed and Sealed this

Twenty-sixth Day of May 1981

[SEAL]

Attest:

RENE D. TEGTMEYER

Attesting Officer   Acting Commissioner of Patents and Trademarks